Patented May 17, 1949

2,470,719

UNITED STATES PATENT OFFICE 2,470,719

STABILIZED FOAM-FORMING COMPOSITION

Joseph M. Perri, West Chester, Pa., assignor to National Foam System, Inc., Philadelphia, Pa., a corporation of Delaware No Drawing. Application May 26, 1945, Serial No. 596,083

4 Claims. (Cl. 252—307)

This invention relates generally to fire extinguishing compositions and more particularly to such foam-forming compositions as are capable, when combined with water, of producing a stabilized foam which is non-supporting of combustion and serves as a blanket to smother and extinguish the flames of such highly combustible materials as oil, gasoline and the like.

Heretofore and prior to this invention various foam-forming compositions have been employed in the production of so-called air or mechanical foam formed by entraining a gaseous medium, such as air, into a finely subdivided stream of water in the presence of a suitable foaming agent or stabilizer, it having been found that a generally satisfactory basic ingredient for such compositions is a water-dispersible proteinaceous product derived from the soy-bean, as described in United States Letters Patent No. 2,269,958, granted January 13, 1942. Numerous other proteinaceous materials including the degradation products of proteins have also been found to be satisfactory under general conditions of use.

However, unless the viscosity of the proteinaceous foam forming liquid is rendered sufficiently stable, the rate of introduction of the foaming material into the water stream, under varying conditions of temperature, is so materially affected as to produce foam of uncertain fire-extinguishing characteristics. Thus, a foam-forming liquid the viscosity of which is of a high order at low temperatures and of a considerable lower order at high temperatures will not produce, from a given quantity of foaming agent, fire-extinguishing foam of maximum possible volume and stability under varying conditions of temperature. Generally, it is desirable in the production of mechanical foam that the foam-forming liquid be introduced into the water stream to form a 6% solution of the liquid. Where the liquid is of relatively high viscosity and is introduced into the water stream at a low temperature, this percentage of the foaming liquid in the water may be so reduced as to result in the production of an inferior fire-extinguishing foam, not only in respect to its volume but also in respect to its stability and permanency.

It is accordingly among the principal objects of the present invention to overcome the aforementioned disadvantages by the preparation and use of a foam-forming liquid of such relatively constant viscosity that its fluidity remains unaffected under varying conditions of temperature.

A further object is to combine with the proteinaceous principle of the foam-forming material a blending agent capable of rendering the foaming agent more readily dispersible in the water stream, there being also included in the foam-forming liquid certain electrolytes which increase the resistance of the foam against too rapid disintegration when applied to the fire, thereby increasing the stability and permanency of the fire-extinguishing foam.

The electrolytes so employed for rendering the foam more stable and less subject to rapid disintegration and deterioration when applied as fire smothering blankets are preferably such compounds as the chlorides, nitrates or sulfates of ferric iron, aluminum, chromium, nickel and cobalt, none of which are readily soluble in the foam forming liquid referred to above. In fact, the normal introduction of such compounds in the liquid, even in small amounts, causes such precipitation of the liquid as to render it unsuitable for use as a fire extinguishing foam forming agent. I have found, however, that these electrolytes may be successfully incorporated into the foam-forming liquid without causing any appreciable precipitation of the latter by the use of urea in combination therewith, the introduction of the electrolytes into the foam-forming liquid in the presence of the urea being, of course, an important object and feature of the present invention.

The use of the urea serves not only to facilitate the successful incorporation of the electrolytes into the foam-forming liquid to thereby provide for the production of a more stable and permanent fire-extinghishing foam, but it also serves the important added function of maintaining substantially constant the viscosity of the liquid, thereby assuring the production of foam of uniform volume and consistency under widely varying temperature conditions.

Other objects and advantages of the present invention will be apparent more fully hereinafter.

In the production of the foam-forming material of the present invention, a batch thereof is produced in accordance with the following procedure. Into 1500 gallons of water, heated to about 200° F., is added approximately 300 pounds of hydrated lime of high calcium content. If desired, an additional amount of sodium hydroxide may be included with the lime to provide a total of approximately 350 pounds of the caustic alkali. This mass is mechanically stirred in the heating tank until a thorough admixture is obtained, the temperature of the water being maintained during all of the mixing period at between 200° and 210° F. To this mixture is then added 1500 pounds of the protein, e. g. soybean, this latter being gradually introduced into the tank over an extended period by sifting in the protein, thereby avoiding excessive lump formations.

This mass (of water, caustic alkali and protein) is continued to be heated over a period of 9 hours at a sustained temperature of approximately 200° F., following which an amount of sulphuric acid (60° Baumé) is added sufficient to render the reaction mass acid to a pH of from 2.5 to 3.5. Thereafter, the acid reaction is permitted to continue for a period of about 2 hours. It is preferable that the reaction mass have a final pH of about 7.0 in order to render the foaming agent produced therefrom suitably soluble in water and to that end a sufficient quantity of neutralizing lime is added to the mass to raise the pH to the desired value of 7.0.

Upon completion of the foregoing operations, all carried out while maintaining the temperature of the liquid mass between 200 and 210 degrees F., the reaction mass is then filtered to remove the calcium sulphate (resulting from the reaction of the lime and acid) and other insoluble material that may be present, following which the dilute filtrate is evaporated to a specific gravity of 1.16, in which final form the filtrate is discharged from the evaporator into a suitable tank for the addition of such inhibitors as may be necessary. These inhibitors are added for the purpose of preserving and inhibiting the final product from subsequent deterioration and to retard decomposition, a suitable inhibitor for this purpose being sodium pentachlorophenate.

The protein hydrolysate as above prepared is now ready for introduction of the electrolyte and the urea hereinbefore referred to. For this purpose, a solution of the two latter substances is prepared in the proportion of 250 pounds of a selected electrolyte or combination of electrolytes and 1670 pounds of urea to 200 gallons of water. As previously indicated the electrolyte may be any one or more of such compounds as the chlorides, nitrates or sulphates of ferric iron, aluminum, chromium, nickel and cobalt. While these compounds are normally insoluble in the protein hydrolysate, they are rendered soluble therein when introduced in combination with the urea by way of the urea-electrolyte solution prepared as just described. This urea-electrolyte solution is mixed with the protein hydrolysate in the proportion of approximately 350 gallons of the former to 1000 gallons of the latter while at an adjusted pH of about 7.0.

The introduction of the urea-electrolyte solution into the hydrolysate is effected slowly and with agitation at a temperature of from 70° F. to 150° F. Inasmuch as the addition of the urea and electrolyte into the hydrolysate tends to reduce its pH value, sodium hydroxide is added to readjust the pH upwardly to a value of 6.4–6.5. It is important that this pH value be maintained for the final product, since liquids having higher pH values produce foams which are not sufficiently stable and resistant for fire-extinguishing purposes.

The resultant hydrolysate, which now includes in solution the electrolyte and urea, is once again filtered into a blending tank for the addition thereto of a suitable blending agent to the extent of approximately fifteen percent (15%) by volume of the completed product. The function of this blending agent is to render the foam-forming liquid more readily dispersible in the water stream under varying conditions of temperature and of greater fluidity at lower temperatures. Thus, such blending agent functions in concert with the urea to provide for uniform proportioning of the foam-forming liquid in the water stream and so insures a uniform consistency of fire-extinguishing foam produced within a wide range of temperature variations.

Suitable blending agents for this purpose may be the glycols or their ethers, such as the mono ethyl ether of ethylene glycol or the mono ethyl ether of diethylene glycol. Other suitable blending agents may be the water-soluble alcohols, such as isopropyl alcohol, ethyl alcohol, diacetone alcohol and tetrahydrofurfuryl alcohol; water soluble esters, such as ethylacetate and methyl acetate; and water soluble ketones, such as acetone. These blending agents may be used singly and to the exclusion of the others, or they may be combined for introduction into the hydrolysate in the proportion of approximately 15% by volume of the completed product.

The foam-forming material as prepared in accordance with the present invention is employed in the proportion of from three to nine percent by volume of the water with which it is admixed to produce mechanical or air foam of maximum volume and increased stability and permanency. The presence of the urea in the foam-forming liquid not only assists the blending agent in lowering its viscosity, but it also serves importantly to maintain the liquid in a more or less constant state of fluidity through a wide range of temperature variations, this being due to the fact that the urea acts as a dispersive agent for the proteinaceous particles with consequent reduction in the viscosity of the protein liquor. In addition, the urea serves as the vehicle by means of which the normally insoluble electrolytes are rendered soluble in the protein hydrolysate, the inclusion of these electrolytes in the surface film of the foam bubbles resulting in a marked increase in the stability and permanency of the fire-extinguishing foam.

It will be understood, of course, that none of the proportions of ingredients hereinbefore described are critical and that such proportions may be varied from time to time within reasonable limits without departing from the general principles or real spirit of the invention as defined in the appended claims.

What is claimed as new and useful is:

1. A foam-forming composition consisting essentially of an aqueous solution of a protein hydrolysate containing a heavy metal salt of an inorganic acid selected from the group consisting of the chlorides, nitrates and sulphates of ferric iron, aluminum, chromium, nickel and cobalt in combination with urea in an amount sufficient to render said salt soluble in said solution.

2. A foam-forming composition consisting essentially of an aqueous solution of a hydrolized protein derived from the soy-bean containing a heavy metal salt of an inorganic acid selected from the group consisting of the chlorides, nitrates and sulphates of ferric iron, aluminum, chromium, nickel and cobalt in combination with urea in an amount sufficient to render said salt soluble in said solution.

3. A foam-forming composition consisting essentially of an aqueous solution of a protein hydrolysate of a specific gravity of approximately 1.160, said hydrolysate including as added ingredients therein a heavy metal salt of an inorganic acid selected from the group consisting of the chlorides, nitrates and sulphates of ferric iron, aluminum, chromium, nickel and cobalt in combination with urea as an agent for rendering said salt soluble in said solution, said added ingredients being present in the solution in the approximate proportion of 1 part of the salt to 6.5 parts of the urea.

4. A foam-forming composition consisting essentially of an aqueous solution of a protein hydrolysate of a specific gravity of approximately 1.160, said hydrolysate including as added ingredients therein a heavy metal salt of an inorganic acid selected from the group consisting of the chlorides, nitrates and sulphates of ferric iron, aluminum, chromium, nickel and cobalt in combination with urea as an agent for rendering said salt soluble in said solution, said added ingredients being present in the solution in the approximate proportion of 1 part of the salt to 6.5 parts of the urea, the salt included in the solution being in an amount sufficient to produce a stable fire-extinguishing foam.

JOSEPH M. PERRI.

REFERENCES CITED

The following references are of record in the file of this patent:

UNITED STATES PATENTS

| Number | Name | Date |
|---|---|---|
| 2,088,085 | Gross | July 27, 1937 |
| 2,154,231 | Daimler | Apr. 11, 1939 |
| 2,269,958 | Urquhart | Jan. 13, 1942 |
| 2,361,057 | Ratzer | Oct. 24, 1944 |

OTHER REFERENCES

Gregory, "Uses and Applications of Chemicals and Related Materials," 1939.